(12) United States Patent
Glickman et al.

(10) Patent No.: US 11,332,003 B2
(45) Date of Patent: May 17, 2022

(54) FUEL OR CHARGING PORT DOOR ASSEMBLY WITH OVERRIDE CONFIGURATION AND ASSIST TOOL

(71) Applicant: Ford Global Technologies, LLC, Dearborn, MI (US)

(72) Inventors: David Brian Glickman, Southfield, MI (US); Scott Shaw, Plymouth, MI (US); Aaron Halonen, Brighton, MI (US); Peter Joseph Bejin, Northville, MI (US); Darshan Arun Nayak, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 16/402,383

(22) Filed: May 3, 2019

(65) Prior Publication Data

US 2020/0346541 A1 Nov. 5, 2020

(51) Int. Cl.
  *B60K 15/05* (2006.01)
  *E05B 83/34* (2014.01)
  *E05B 81/90* (2014.01)

(52) U.S. Cl.
  CPC ............ *B60K 15/05* (2013.01); *E05B 81/90* (2013.01); *E05B 83/34* (2013.01); *B60K 2015/053* (2013.01); *B60K 2015/0561* (2013.01)

(58) Field of Classification Search
  CPC ...... E05B 83/34; E05B 81/90; E05B 17/0058; E05B 19/20; E05B 35/008; E05B 81/54;
  (Continued)

(56) References Cited

U.S. PATENT DOCUMENTS 4,295,390 A * 10/1981 Buchta .................... F15B 13/10
                                                                74/625
5,044,033 A * 9/1991 Fosberg ............... B23D 29/026
                                                                7/166
(Continued)

FOREIGN PATENT DOCUMENTS

DE     102009053996 A1    5/2011
DE     102015220484 A1 *  4/2017  ............. B60K 15/05
(Continued)

OTHER PUBLICATIONS

"BMW Fuel Door Manual Override Release, Emergency Open," posted Mar. 27, 2017 at BIMMERtips.com, downloaded from https://bimmertips.com/bmw-fuel-door-override-release-emergency-open/, Apr. 10, 2019.

*Primary Examiner* — Kristina R Fulton
*Assistant Examiner* — Noah Horowitz
(74) *Attorney, Agent, or Firm* — Vichit Chea; Carlson, Gaskey & Olds, P.C.

(57) ABSTRACT

This disclosure relates to a fuel or charging port door assembly of a motor vehicle. In particular, this disclosure relates to a fuel or charging port door assembly configured to permit a door to open when an override force is applied using an assist tool, for example. An example vehicle includes a door configured to move relative to a body of the vehicle between open and closed positions. The door is a fuel door or a charging port door. The vehicle also includes a lock assembly including a base and a tip. The base is configured to hold the tip during normal operating conditions, and the base and tip are configured to separate upon application of an override force to the door.

16 Claims, 4 Drawing Sheets

(58) Field of Classification Search
CPC ............ B60K 15/05; B60K 2015/0515; B60K 2015/053; B60K 2015/0538; B60K 2015/0561
USPC .......................................... 296/97.22; 74/625
See application file for complete search history.

(56) References Cited

U.S. PATENT DOCUMENTS

| | | | |
|---|---|---|---|
| 6,739,633 | B2 | 5/2004 | Holloway et al. |
| 8,720,968 | B2 * | 5/2014 | Zalan ..................... B60L 53/16 |
| | | | 296/97.22 |
| 9,457,651 | B2 | 10/2016 | Lindlbauer et al. |
| 9,493,330 | B2 * | 11/2016 | Nestor .................... B66F 15/00 |
| 9,950,615 | B2 | 4/2018 | Horikawa et al. |
| 9,982,467 | B2 * | 5/2018 | Watanabe ............... E05B 83/34 |
| 2017/0328094 | A1 | 11/2017 | Zia et al. |
| 2018/0105036 | A1 | 4/2018 | Guardianelli |
| 2020/0398663 | A1 * | 12/2020 | Hirotani ................. E05B 81/06 |

FOREIGN PATENT DOCUMENTS

| | | | | | |
|---|---|---|---|---|---|
| DE | 102017129049 | A1 * | 6/2019 | ............ | B60K 15/04 |
| FR | 3016854 | A1 | 7/2015 | | |
| WO | WO-2017129412 | A1 * | 8/2017 | ............ | B60K 15/05 |

* cited by examiner

FUEL OR CHARGING PORT DOOR ASSEMBLY WITH OVERRIDE CONFIGURATION AND ASSIST TOOL

TECHNICAL FIELD

This disclosure relates to a fuel or charging port door assembly configured to permit a door to open when an override force is applied using an assist tool, for example.

BACKGROUND

Motor vehicles are known to include fuel and/or charging port doors which are configured to rotate between open and closed positions to selectively expose and cover a fuel fill tube or charging port. Some doors are lockable in the closed position. For instance, hybrid electric vehicles (HEVs) sometimes pressurize fuel during operation and lock the fuel door while the fuel is pressurized.

SUMMARY

A vehicle according to a non-limiting aspect of the present disclosure includes, among other things, a door configured to move relative to a body of the vehicle between open and closed positions. The door is a fuel door or a charging port door. The vehicle further includes a lock assembly including a base and a tip. The base is configured to hold the tip during normal operating conditions, and the base and tip are configured to separate upon application of an override force to the door.

In a further non-limiting embodiment of the foregoing vehicle, the vehicle includes a latch configured to selectively move between a lock position in which the latch contacts the tip and an unlock position in which the latch does not contact the tip.

In a further non-limiting embodiment of any of the foregoing vehicles, when the latch is in the lock position and the override force is applied, the latch holds the tip such that the tip separates from the base.

In a further non-limiting embodiment of any of the foregoing vehicles, the tip and base are configured to be reattached by closing the door.

In a further non-limiting embodiment of any of the foregoing vehicles, the tip includes a ball stud, and the base includes a socket configured to receive the ball stud during normal operating conditions.

In a further non-limiting embodiment of any of the foregoing vehicles, the base includes a projection configured to contact the tip adjacent the ball stud during normal operating conditions.

In a further non-limiting embodiment of any of the foregoing vehicles, the tip includes a channel adjacent the ball stud, and the projection is received in the channel.

In a further non-limiting embodiment of any of the foregoing vehicles, the override force is sufficient to overcome the force the projection applies to the tip.

In a further non-limiting embodiment of any of the foregoing vehicles, the vehicle includes a hinge arm, and the door is rotatably connected to the body of the vehicle by the hinge arm.

In a further non-limiting embodiment of any of the foregoing vehicles, the base is mounted to the hinge arm adjacent a free end of the hinge arm.

In a further non-limiting embodiment of any of the foregoing vehicles, the door covers the base from an exterior perspective.

In a further non-limiting embodiment of any of the foregoing vehicles, the vehicle includes a tool configured to apply the override force to the door.

In a further non-limiting embodiment of any of the foregoing vehicles, the tool includes a first end portion and a second end portion generally opposite the first end portion, the first end portion is configured to be grasped by a hand of a user, the second end portion includes first and second spaced-apart hooks curving toward a first side of the tool and configured to fit in a space between the door and the body when the door is closed, the second end portion further includes a fulcrum curving toward a second side of the tool opposite the first side, and the tool further includes an alignment tab on the first side of the tool and projecting generally from the second end portion toward the first end portion.

In a further non-limiting embodiment of any of the foregoing vehicles, the alignment tab is configured to contact the door.

In a further non-limiting embodiment of any of the foregoing vehicles, an end of the alignment tab is curved.

In a further non-limiting embodiment of any of the foregoing vehicles, the fulcrum is configured to contact the body of the vehicle, and the tool is configured to rotate about the fulcrum to apply the override force.

A method according to an exemplary aspect of the present disclosure includes, among other things, applying an override force to open a door of a vehicle such that a base and tip of a lock assembly separate. Further, the door is a fuel door or a charging port door.

In a further non-limiting embodiment of the foregoing method, the method includes reattaching the base and tip by closing the door.

In a further non-limiting embodiment of any of the foregoing methods, the method includes applying the override force with a tool.

In a further non-limiting embodiment of any of the foregoing methods, the method includes applying the override force while holding the tip relative to a body of the vehicle with a latch.

DETAILED DESCRIPTION

This disclosure relates to a fuel or charging port door assembly of a motor vehicle. In particular, this disclosure relates to a fuel or charging port door assembly configured to permit a door to open when an override force is applied using an assist tool, for example. An example vehicle includes a door configured to move relative to a body of the vehicle between open and closed positions. The door is a fuel door or a charging port door. The vehicle also includes a lock assembly including a base and a tip. The base is configured to hold the tip during normal operating conditions, and the base and tip are configured to separate upon application of an override force to the door. When a user applies a prying force to the door, the base separates from the tip, minimizing (if not eliminating) any damage to a hinge arm and/or door. Moreover, one can reset the lock assembly simply by closing the door, which causes the tip to snap back into the base. The door and lock assembly are thus reusable. Additional benefits of this disclosure will be appreciated from the following written description.

Figure 1:
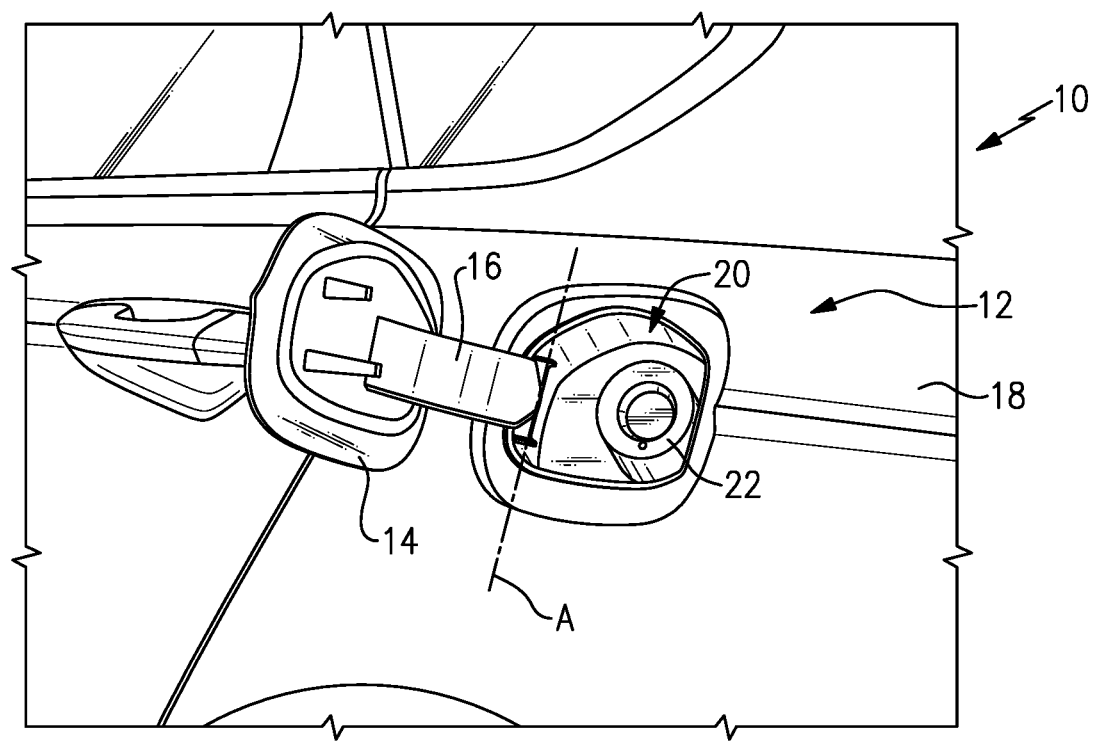
FIG. 1 illustrates a portion of a vehicle, and in particular illustrates an example fuel door assembly.

FIG. 1 illustrates a portion of a motor vehicle 10. The vehicle 10 may be an electrified vehicle, such as a plug-in hybrid electric vehicle (PHEV) or battery electric vehicle (BEV). This disclosure is not limited to electrified vehicles, but has particular advantages when used relative to electrified vehicles, as will be appreciated from the description herein.

FIG. 1 also illustrates a fuel door assembly 12, which includes a fuel door 14 and a hinge arm 16. The fuel door 14 is rotatable about a pivot axis A relative to a body 18 of the vehicle 10 by way of the hinge arm 16 between open and closed positions to selectively expose and cover a fuel compartment 20, respectively. A tube 22 leading to a fuel tank of the vehicle 10 is in the fuel compartment 20. In FIG. 1, the body 18 is a rear quarter panel of the vehicle 10. The fuel door assembly 12 may be arranged elsewhere on the vehicle 10, however, and this disclosure is not limited to fuel door assemblies arranged on rear quarter panels. Further, while a fuel door assembly is shown in the figures, this disclosure applies to charging port assemblies and, in particular, to lock assemblies for charging port doors.

Figure 2:
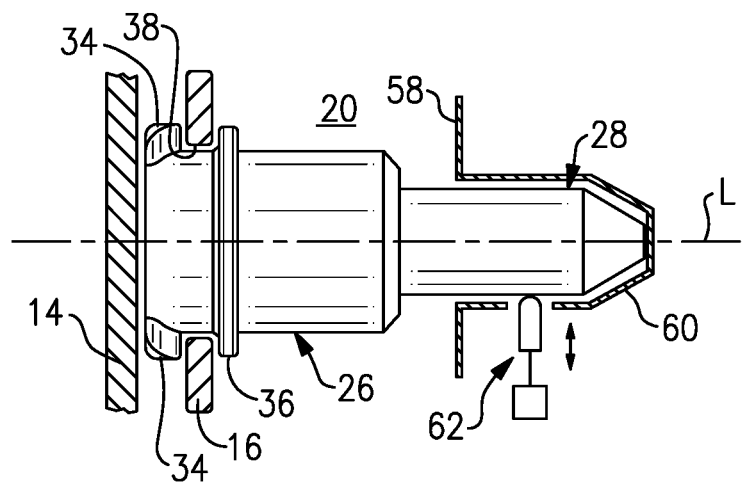
FIG. 2 is a side view illustrating the fuel door assembly in more detail, and in particular illustrating a lock assembly.

In FIG. 1, the fuel door 14 is in the open position. FIG. 2 is a side, partial-cross-sectional view representative of the fuel door 14 in the closed position. FIG. 2 also illustrates a lock assembly 24 including a base 26 and a tip 28. The lock assembly 24 is arranged generally opposite the pivot axis A. As will be explained in more detail below, the lock assembly 24 is configured to permit locking of the fuel door 14 during normal operating conditions (i.e., during normal use).

In normal operating conditions, the base 26 is configured to hold the tip 28. However, if the fuel door 14 is undesirably locked or otherwise held in the closed position, the lock assembly 24 is configured to permit a user to easily open the fuel door 14 by applying an override force to the fuel door 14. When the override force is applied, the base 26 and tip 28 are configured to separate, thereby permitting the fuel door 14 to open while minimizing or eliminating damage to the fuel door assembly 12. For purposes of this disclosure, normal operating conditions are all conditions when the base 26 and tip 28 are not separated.

Figure 3:
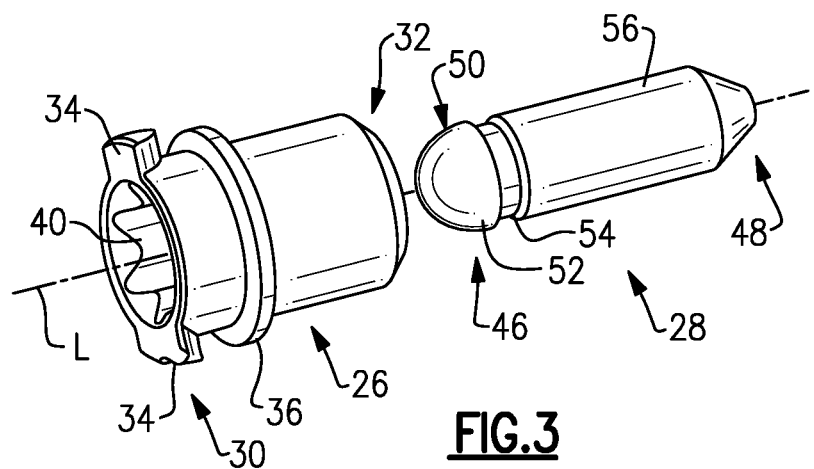
FIG. 3 is an exploded, rear-perspective view of a base and a tip of the lock assembly.
Figure 4:
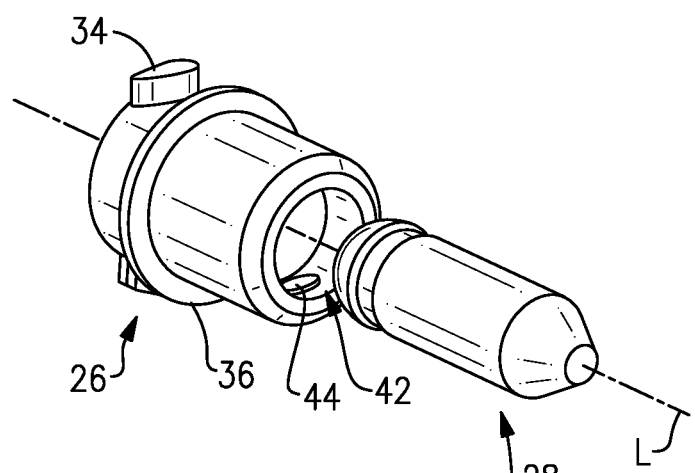
FIG. 4 is an exploded, front-perspective view of the base and the tip.

The detail of the lock assembly 24 will now be explained with reference to FIGS. 3 and 4, and with continued reference to FIG. 2. Beginning with the base 26, the base 26 is a generally cylindrical member disposed about a longitudinal axis L. The base 26 extends from a first end portion 30 to a second end portion 32. Adjacent the first end portion 30, the base 26 includes ears 34 arranged opposite one another on an exterior surface of the base 26. The exterior surface of the base 26 also includes an annular tab 36 spaced-apart from the ears 34 along the longitudinal axis L.

The ears 34 and annular tab 36 facilitate attachment of the base 26 to the hinge arm 16, in this example. In particular, the base 26 may be inserted into an opening 38 in the hinge arm 16 such that the ears 34 are arranged on a first side of the hinge arm 16 in a space between the fuel door 14 and the hinge arm 16, with the annular tab 36 arranged on an a second, opposite side of the hinge arm 16. To this end, the fuel door 14 covers the base 26 and the remainder of the lock assembly 24 from an exterior perspective.

The base 26 further includes a drive socket 40 adjacent the first end portion 30 configured to cooperate with a driver. The drive socket 40 could be configured to receive a Torx head or another type of driver, such as a traditional screwdriver. After insertion of the base 26 into the opening 38, a driver may be used to turn the base 26 about 90° (i.e., a quarter turn) about the longitudinal axis L such that the ears 34 do not slide out of the opening 38. The opening 38 may be non-circular. Further, the opening 38 may be arranged adjacent a free end of the hinge arm 16 at a generally opposite end of pivot axis A. This disclosure extends to other ways of connecting the base 26 to the hinge arm 16 and other locations of the opening 38.

Adjacent the second end portion 32 of the base 26, the base 26 includes a socket 42 configured to hold the tip 28 during normal operating conditions. The inner diameter of the socket 42 includes at least one projection configured to contact the tip 28 and hold the tip 28 in the socket 42 during normal operating conditions. In this example, the projection is a tab 44 projecting radially inward toward the longitudinal axis L from the remainder of the inner diameter of the socket 42. The tab 44 is spaced axially inward from the terminal end of the base 26. While projections and tabs 44 are specifically mentioned herein, this disclosure extends to other ways of releasably holding the tip 28 within the base 26.

With reference to the tip 28, the tip 28 is a substantially cylindrical member having a first end portion 46 and a second end portion 48 spaced-apart from the first end portion 46 along the longitudinal axis L. The base 26 and tip 28 are separate elements and are formed separately from one another. In FIGS. 2-4, the base 26 and tip 28 are described relative to the same longitudinal axis L for convenience and because, in normal operating conditions when the base 26 holds the tip 28, the base 26 and tip 28 are coaxial.

Adjacent the first end portion 46, the exterior surface of the tip 28 is arranged as a ball stud 50, which has a profile configured to releasably lock with the base 26. In this example, the ball stud 50 exhibits a semi-spherical profile 52 adjacent the absolute end of the tip 28 and defines a channel 54 axially inward of the semi-spherical profile 52. During normal operating conditions when the tip 28 is received in the socket 42 of the base 26, the tab 44 projects into the channel 54.

The tip 28 also includes a main shaft section 56 along a majority of the length of the tip 28. The main shaft section 56 may include engagement features, such as threads or a knurled surface, configured to mate with a latch. The exterior surface of the tip 28 gradually tapers approaching the second end portion 48 to facilitate insertion of the tip 28 into a locking recess.

In FIG. 2, the fuel compartment 20 includes a housing 58 defining a locking recess 60 configured to receive the tip 28 when the fuel door 14 is closed. A latch 62, which is schematically illustrated in FIG. 2, is configured to selectively move between a lock position in which the latch 62 contacts the tip 28 and an unlock position in which the latch 62 does not contact the tip 28. When in the lock position, the latch 62 is configured to hold the tip 28 in the locking recess 60. Specifically, the latch 62 is configured to apply a force to the tip greater than what is required to separate the base 26 and tip 28. As such, when the latch 62 is in the lock position and an override force is applied to the fuel door 14, the latch 62 holds the tip 28 such that the tip 28 separates from the base 26.

The present disclosure is useful when the fuel door 14 is undesirably held in the closed position. For instance, the latch 62 may be malfunctioning. Further, the latch 62 may hold the fuel door 14 closed when a fuel tank of the vehicle 10 is pressurized, which is often the case in some electrified vehicles, namely HEVs. The user may confuse this with a malfunctioning latch and/or fuel door, and thus the user may attempt to pry open the fuel door 14.

Regardless of the circumstance, a user may use a tool to pry open the fuel door 14. Specifically, the user may use a tool to apply an override force sufficient to separate the base 26 and the tip 28 by overcoming the force the tab 44 applies to the tip 28. With the base 26 and tip 28 separated, the fuel door 14 is permitted to swing to the open position. The lock assembly 24 is reset by reattaching the base 26 and tip 28 simply by closing the fuel door 14, at which point the ball stud 50 reenters the socket 42 such that the base 26 again holds the tip 28.

Figure 5:
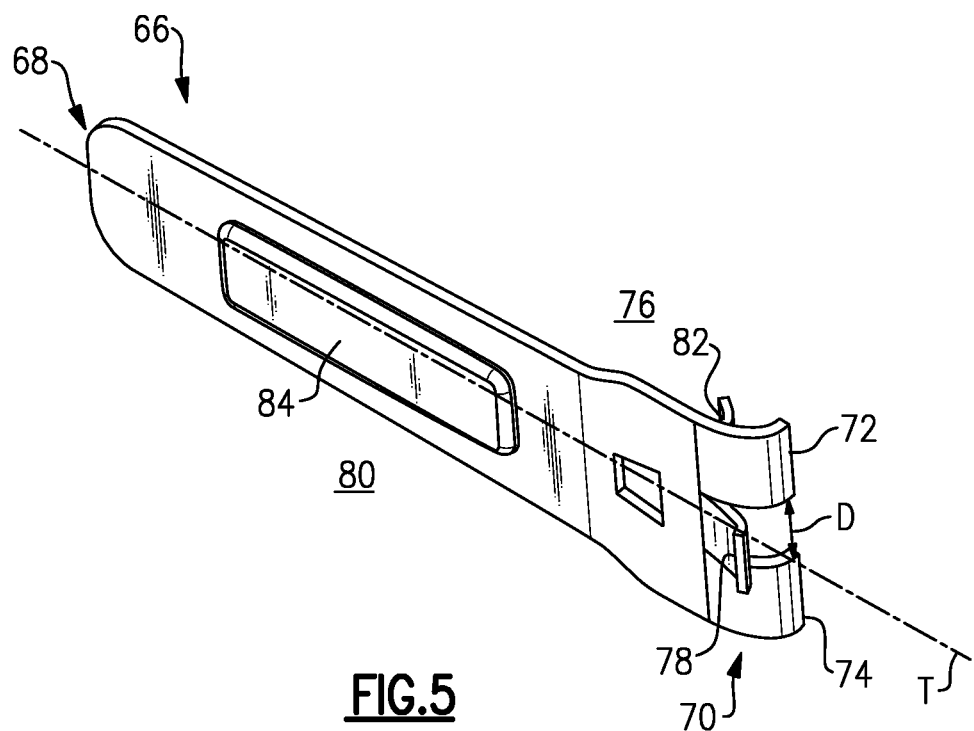
FIG. 5 is a perspective view an example pry tool.
Figure 6:
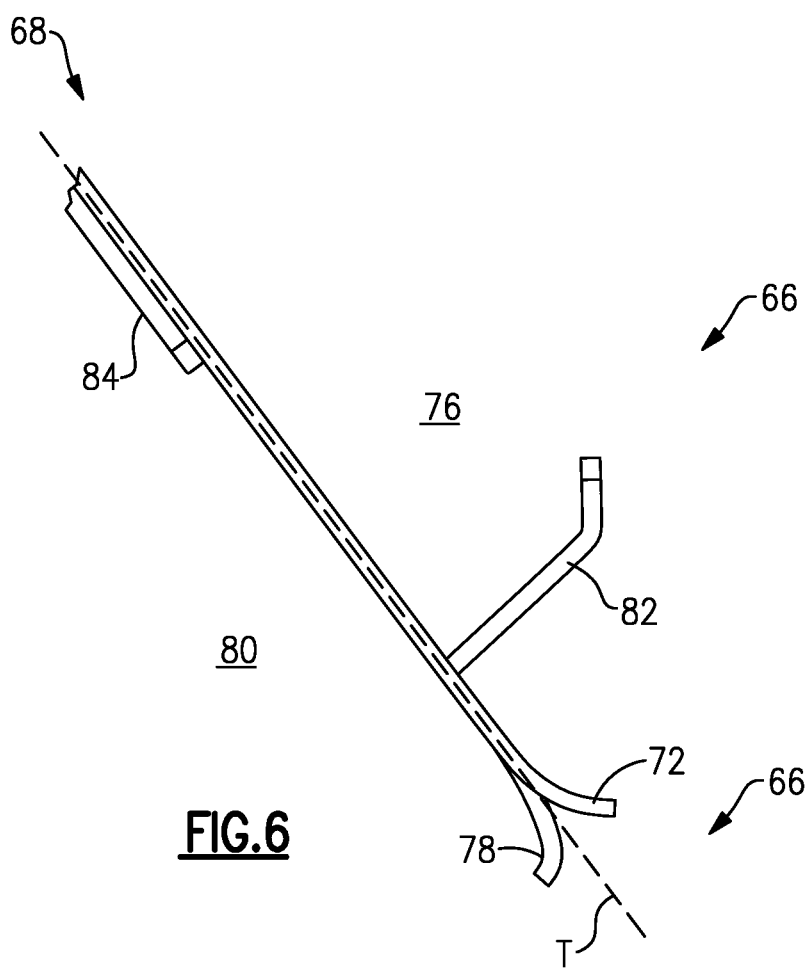
FIG. 6 is a top view of a portion of the example pry tool.

In general, the override force may be applied using any number of known tools, including a flathead screwdriver as one example. However, this disclosure includes a particular tool which has benefits over traditional tools. FIG. 5 illustrates an example pry tool 66 configured to apply the override force to the fuel door 14. Among other benefits, the pry tool 66 is relatively inexpensive, easily manufactured, ergonomic, and configured to minimize if not eliminate damage to the vehicle 10, including avoiding scratching the fuel door 14 or body 18.

The pry tool 66 the tool includes a first end portion 68 and a second end portion 70 generally opposite the first end portion 68. In particular, pry tool 66 has a length dimension extending along a longitudinal axis T, and the first end portion 68 and second end portion 70 are spaced-apart from one another along the longitudinal axis T.

The first end portion 68 is configured to be grasped by a hand of a user. In an alternate embodiment, the first end portion 68 could also incorporate an ice scraper.

The second end portion 70 is configured to align the pry tool 66 relative to the fuel door 14 and apply the override force to the fuel door 14. In this example, the second end portion 70 has first and second spaced-apart hooks 72, 74 curving toward a first side 76 of the pry tool 66. The first and second hooks 72, 74 are configured to fit in a space between the fuel door 14 and the body 18 when the fuel door 14 is closed. The first and second hooks 72, 74 are spaced apart in a direction D normal to the longitudinal axis T. The size of the first and second hooks 72, 74 and relative spacing in the direction D provides a locating feature, as will be explained below. Further, the first and second hooks 72, 74 may be tapered to facilitate insertion into a gap between the fuel door 14 and the body 18.

The second end portion 70 also includes a fulcrum 78 curving toward a second side 80 of the tool opposite the first side 76. The pry tool 66 further includes an alignment tab 82 on the first side 76 and projecting generally in a direction extending from the second end portion 70 toward the first end portion 68. Ends of the hooks 72, 74, fulcrum 78, and alignment tab 82 may be curved to reduce the likelihood of scratching the fuel door 14 or body 18.

In this example, the pry tool 66 also includes a raised section 84 which includes instructions for using the pry tool 66. The instructions may be printed on the raised section 84 or molded therein. The raised section 84 may provide a more natural grip and substantial, three-dimensional feel to improve ergonomics and control.

To this end, the pry tool 66 is formed of a single, integral piece of material. The pry tool 66 may be integrally formed of a non-metallic material to reduce the likelihood the pry tool 66 scratches the fuel door 14 or body 18. One example material is nylon. This disclosure is not limited to any particular material type, however. Further, when not in use, the pry tool 66 may be stored in a glove compartment or other storage compartment within the vehicle 10.

Figure 7:
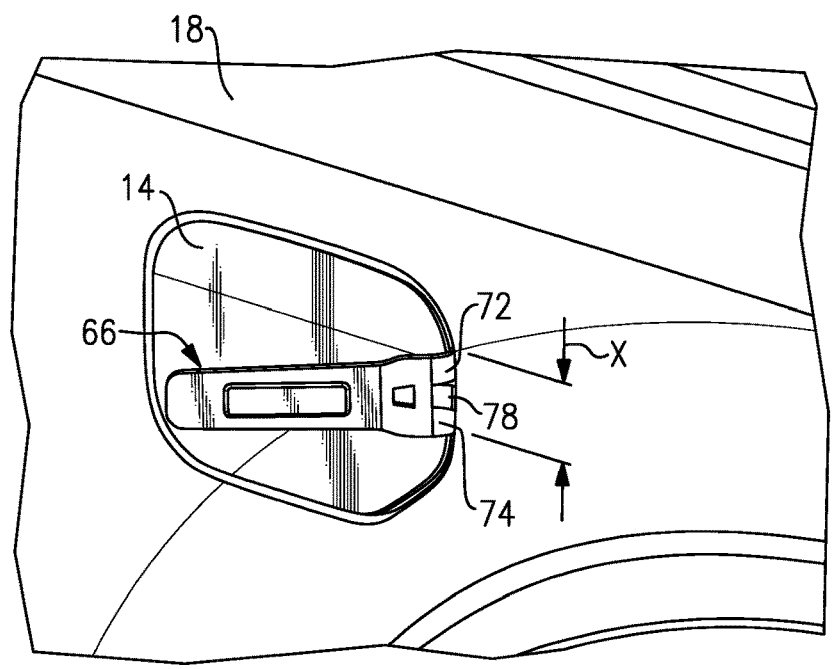
FIG. 7 is a perspective view of the pry tool relative to a fuel door assembly.
Figure 8:
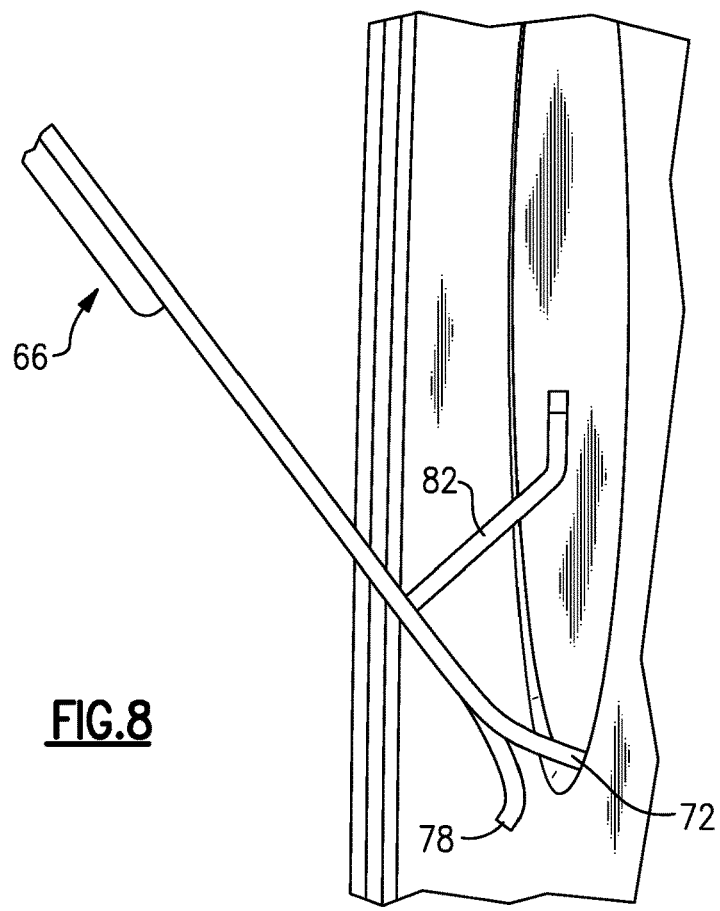
FIG. 8 is a top view of the pry tool relative to the fuel door assembly.

FIGS. 7 and 8 illustrate the pry tool 66 in use. In FIGS. 7 and 8, a fuel door 14 is closed, and a user has inserted the first and second hooks 72, 74 into a gap between the fuel door 14 and a vehicle body 18. With reference to FIG. 7, outer surfaces of the first and second hooks 72, 74 are spaced-apart from one another by a dimension X in a vertical direction (i.e., up-and-down, relative to FIG. 7). The dimension X corresponds to a straight, non-curved section of a gap between the fuel door 14 and the body 18, such that the first and second hooks 72, 74 may be inserted into the gap. The gap also corresponds to an acceptable location for applying a prying force. Accordingly, as mentioned above, the arrangement of the first and second hooks 72, 74 provides the pry tool 66 with a self-locating feature.

With the first and second hooks 72, 74 in the gap, the alignment tab 82 is configured to contact an exterior surface of the fuel door 14 and prevent the pry tool 66 from being positioned too close to the fuel door 14. In other words, the alignment tab 82 ensures that the user can grasp the pry tool 66 by placing their hand in a space between the pry tool 66 and the fuel door 14, as generally shown in FIG. 8. This disclosure is not limited to a particular shape of the alignment tab 82. In another example, the alignment tab 82 may be shaped such that it does not resemble the hooks 72, 74 to avoid user confusion (i.e., so a user does not attempt to place alignment tab 82 into the gap between the fuel door 14 and the body 18).

In the position of FIGS. 7 and 8, the fulcrum 78 is configured to contact the body 18. The pry tool 66 is configured to rotate away from the fuel door 14 about the fulcrum 78 to apply the override force. In particular, a user pulls the pry tool 66 away from the fuel door 14, which causes the pry tool 66 to rotate about the fulcrum 78 and further causes the first and second hooks 72, 74 to apply the override force to the fuel door 14. The override force, in turn, separates the base 28 and tip 28, permitting the fuel door 14 to open.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
a door configured to move relative to a body of the vehicle between open and closed positions, wherein the door is one of a fuel door and a charging port door;
a lock assembly including a base and a tip, wherein the base is configured to hold the tip during normal operating conditions, and wherein the base and tip are configured to separate upon application of an override force to the door;
a latch configured to selectively move between a lock position in which the latch contacts the tip and an unlock position in which the latch does not contact the tip; and
a hinge arm, wherein the door is rotatably connected to the body of the vehicle by the hinge arm, wherein the base is mounted to the hinge arm adjacent a free end of the hinge arm, and wherein the base is attached to the hinge arm such that the base is received partially in an opening of the hinge arm.

2. The vehicle as recited in claim 1, wherein, when the latch is in the lock position and the override force is applied, the latch holds the tip such that the tip separates from the base.

3. The vehicle as recited in claim 2, wherein the tip and base are configured to be reattached by closing the door.

4. The vehicle as recited in claim 3, wherein:
the tip includes a ball stud, and
the base includes a socket configured to receive the ball stud during normal operating conditions.

5. The vehicle as recited in claim 4, wherein the base includes a projection configured to contact the tip adjacent the ball stud during normal operating conditions.

6. The vehicle as recited in claim 5, wherein:
the tip includes a channel adjacent the ball stud, and
the projection is received in the channel.

7. The vehicle as recited in claim 6, wherein the override force is sufficient to overcome the force the projection applies to the tip.

8. The vehicle as recited in claim 1, wherein the door covers the base from an exterior perspective.

9. The vehicle as recited in claim 1, further comprising a tool configured to apply the override force to the door.

10. The vehicle as recited in claim 9, wherein:
the tool includes a first end portion and a second end portion generally opposite the first end portion,
the first end portion is configured to be grasped by a hand of a user,
the second end portion includes first and second spaced-apart hooks curving toward a first side of the tool and configured to fit in a space between the door and the body when the door is closed,
the second end portion further includes a fulcrum curving toward a second side of the tool opposite the first side, and
the tool further includes an alignment tab on the first side of the tool and projecting generally from the second end portion toward the first end portion.

11. The vehicle as recited in claim 10, wherein the alignment tab is configured to contact the door.

12. The vehicle as recited in claim 11, wherein an end of the alignment tab is curved.

13. The vehicle as recited in claim 10, wherein the fulcrum is configured to contact the body of the vehicle, and the tool is configured to rotate about the fulcrum to apply the override force.

14. A method, comprising:
applying an override force to open a door of a vehicle such that a base and tip of a lock assembly separate such that the base is held by the door and the tip is held by a body of the vehicle,
wherein the door is one of a fuel door and a charging port door,
wherein a latch is configured to selectively move between a lock position in which the latch contacts the tip and an unlock position in which the latch does not contact the tip,
wherein the door is rotatably connected to the body of the vehicle by a hinge arm, wherein the base is mounted to the hinge arm adjacent a free end of the hinge arm, and wherein the base is attached to the hinge arm such that the base is received partially in an opening of the hinge arm.

15. The method as recited in claim 14, further comprising: reattaching the base and tip by closing the door.

16. The method as recited in claim 14, further comprising: applying the override force with a tool.

* * * * *